United States Patent Office 2,985,026
Patented May 23, 1961

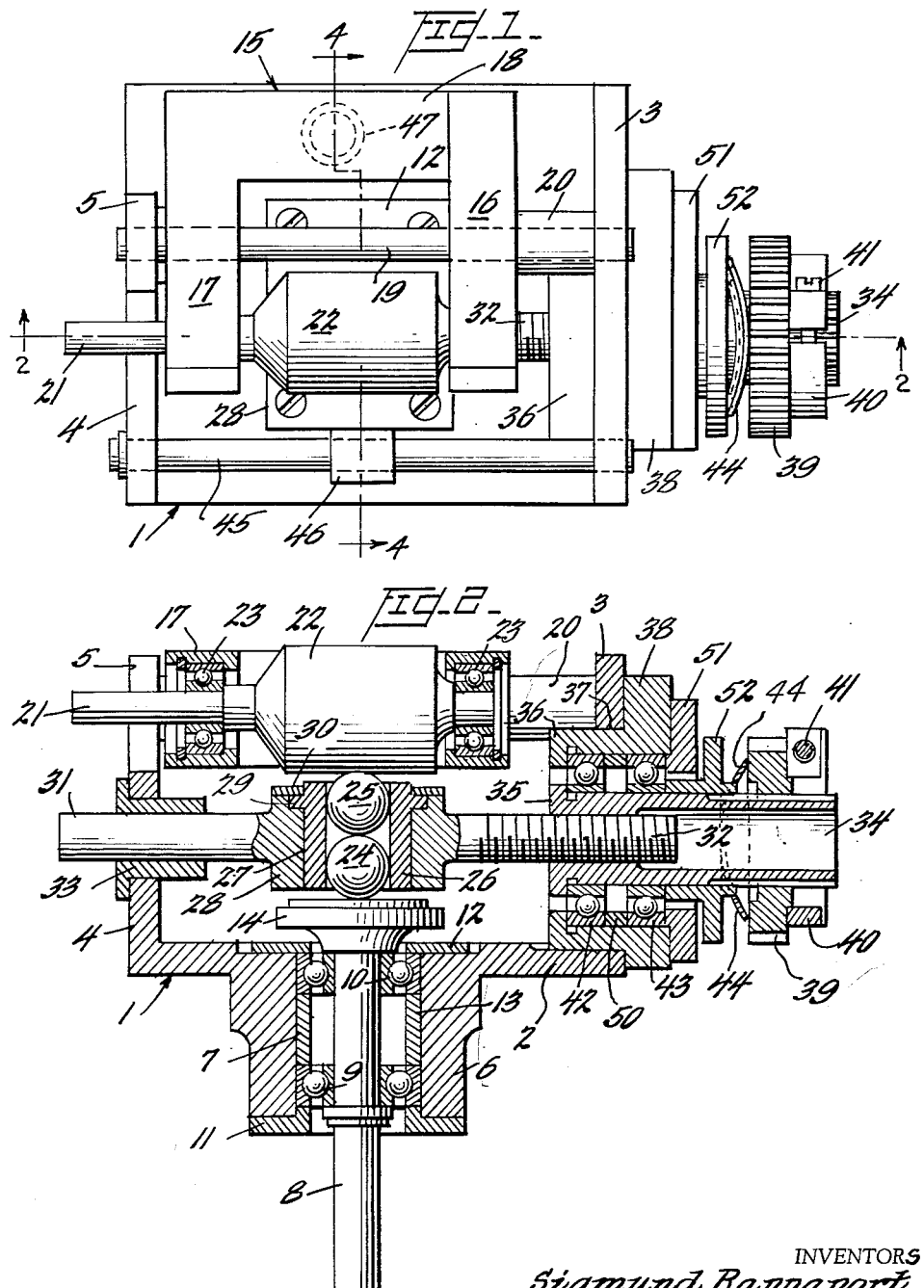

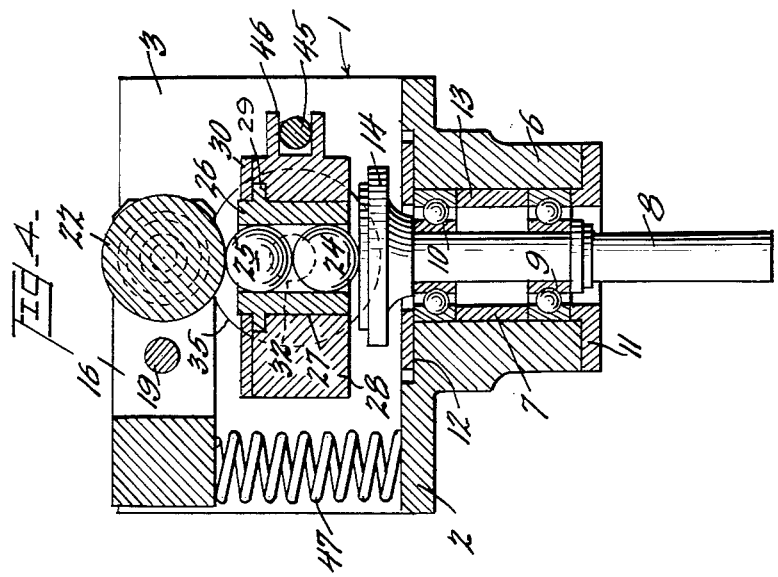
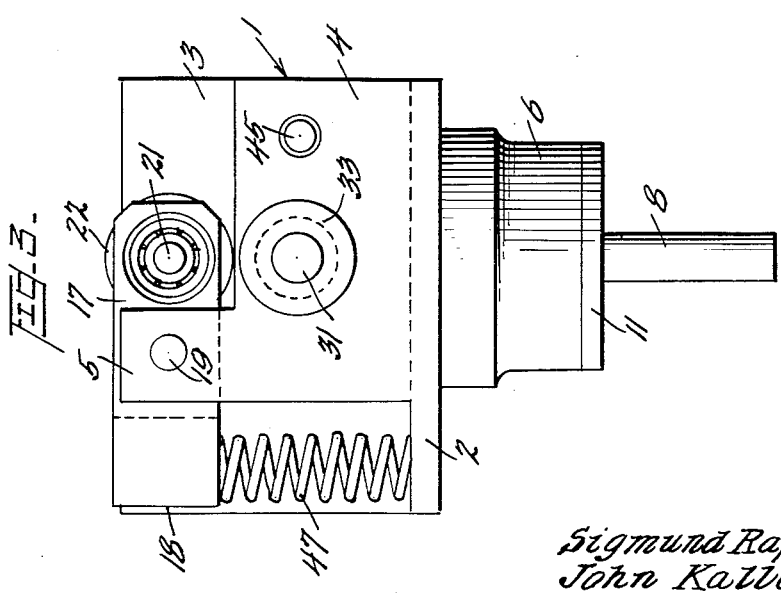

2,985,026

HIGH ACCURACY BALL AND DISC INTEGRATOR

Sigmund Rappaport, Port Washington, and John Kallenberg, Garden City, N.Y., assignors to Sperry Rand Corporation, Ford Instrument Company Division, Wilmington, Del., a corporation of Delaware Filed Oct. 19, 1959, Ser. No. 847,272

4 Claims. (Cl. 74—198)

This invention relates generally to computing integrators of the old and well known ball and disk type. More specifically, the invention relates to the means for moving the ball carriage diametrically back and forth across the disk.

Integrators of this type comprise generally a rotatable disk carried by an input shaft, a rotatable cylinder carried by an output shaft the axis of which is perpendicular to and intersects the axis of the disk and input shaft, and a pair of contacting balls disposed in engagement with the disk and cylinder respectively and movable back and forth diametrically across the disk in a path parallel to the axis of the cylinder and output shaft. The balls are mounted in a cage carried by a reciprocally mounted carriage by which the balls are moved back and forth across the disk. The carriage is driven by either a screw drive or a rack drive, both of which employ a force which is out of line with the ball centers. In the screw drive where the lead nut is an integral part of the carriage the screw must of necessity bypass the ball centers for physical reasons, and in the rack drive the tooth presure force is offset from the guidance center. Due to the necessary clearances between moving members, both methods result in a moment couple tending to displace the contact point between the bottom ball and the disk when the direction of carriage travel is reversed. And the exactness of the location of the contact point is the determining factor for the accuracy of the integrator.

It is therefore the principle object of this invention to provide a carriage drive which is so constructed and arranged that the moment couple tending to displace the contact point between the ball and disk is eliminated thereby providing a more accurate instrument.

To this end we provide a ball carriage with a pair of coaxial trunnions one on each side of the carriage, the axis of which is parallel to the axis of the output shaft and roller and passes through the center line of the balls. One of these trunnions is screw threaded for the reception of a driving nut, which in conjunction with the threaded trunnion constitutes the driving means for the carriage; and the other of these trunnions is a smooth cylinder which serves as a lateral guide rod. The driving nut is rotatably mounted in the frame and is held against any axial movement by a pair of thrust bearings and a "Belleville" spring.

Having stated the principal object of the invention, other and more specific objects thereof will be apparent from the following specification and the accompanying drawings forming a part thereof, in which:

Fig. 1 is a top plan view of a ball and disk integrator constructed according to our invention;

Fig. 2 is a vertical longitudinal section taken on line 2—2 on Fig. 1;

Fig. 3 is a side elevation of the integrator looking from the left of Fig. 1; and Fig. 4 is a vertical transverse section taken on the line 4—4 on Fig. 1.

Referring now to the drawings by reference characters, the numeral 1 indicates a frame having a base plate 2 and a pair of longitudinally spaced side plates 3 and 4 which are integral therewith and extend upwardly from opposite sides thereof. The side plate 3 and the side plate 4 extend from the front end to the rear end of the base plate 2. The base plate 2 is provided with a downwardly extending boss 6 having a bore 7 in which an input shaft 8 is rotatably mounted by means of a pair of vertically spaced antifriction bearings 9 and 10 which are held in place by removable caps 11 and 12 and a spacing collar 13. A disk 14 is secured to the upper end of the input shaft 8 for rotation therewith.

A yoke 15, consisting of an L-shaped piece having a forwardly extending arm 17 and a connecting section 18 and an arm 16 parallel to arm 17 and connected at the rear end thereof to connecting section 18, is rotatably mounted, for slight rocking movement, upon a shaft 19 which is secured to and between the side plate 3 and the extension 5 of the side plate 4 adjacent the upper ends thereof, and extends through the arms 16 and 17 intermediate the front and rear ends thereof. Shaft 19 goes through the center of gravity of the assembly of the yoke 15 and roller 22. The effect of this is that upon the whole integrator unit being subjected to accelerating forces no change in presure force is experienced between roller 22 and balls 24 and 25 and disk 14 which results in a uniform output torque. Spacers 20 are provided to maintain the yoke in proper position. An output shaft 21 having a roller 22 secured thereon for rotation therewith is rotatably mounted between the arms 16 and 17, adjacent the forward ends thereof, by means of antifriction bearings 23. The axis of the output shaft 21 and roller 22 is perpendicular to and intersects the axis of the input shaft 8 and disk 14.

A pair of axially aligned contacting balls 24 and 25 are interposed between the disk 14 and the roller 22 with the ball 24 in contact with the disk 14 and the ball 25 in contact with the roller 22, the aligning axis of the balls being parallel to the axis of the input shaft 8 and disk 14. The balls 24 and 25 are disposed in a cage 26, preferably eccentric for setting purposes, which is removably mounted in a complementary bore 27 in a reciprocally mounted carriage 28 by means of an annular flange 29 and a removable cap 30.

The carriage 28 is provided with a pair of axially aligned trunnions 31 and 32 which extend outwardly from opposite sides thereof. The trunnion 31 which is smooth is slidably mounted in a bushing 33 carried by the side plate 4, and the trunnion 32 is screw threaded for the reception of a driving nut 34. The driving nut 34, which is provided with an annular flange 35 about the inner end thereof is rotatably mounted in a sleeve 36 which is secured in fixed position in an aperture 37 in the side plate 3 by means of an annular flange 38 which is bolted to the side plate 3 by screws, not shown. A gear 39 through which the driving nut 34 is rotated is removably and adjustably secured on the outer end of the driving nut 34 by a split clamp 40 and screw 41. The nut 34 is held against axial movement by ball bearings 42 and 43 which are interposed between the sleeve 36 and the nut 34, and are held apart by a spacer 50, a retainer 51 which is fastened to the annular flange 38 and locks the outer races of the ball bearings and an inner retainer 52 which preloads the inner races of the ball bearings by means of a "Belleville" spring 44.

The axis of the trunnions 31 and 32 is parallel to the axis of the output shaft 21 and roller 22, and intersects both the aligning axis of the balls 24 and 25 and the axis of the input shaft 8 and disk 14. Rotation of the driving nut 34 will therefore move the balls 24 and 25 diametrically across the disk 14 in a path which is parallel to the axis of the output shaft 21 and roller 22, with the line of force applied to the carriage being coincident with the axis of the trunnions 31 and 32. In order to prevent any rotary movement of the carriage 28 during operation a rod 45, which is secured to and between the side plates 3 and 4 parallel to the axis of the output shaft 21 and extends through a boss 46 on the carriage, is provided; and in order to maintain the balls 24 and 25 in firm contact with each other and with the disk 14 and roller 22 a compression spring 47 is provided, which is disposed between the base plate 2 and the section 18 of the yoke 15.

From the foregoing it will be apparent to those skilled in this art that we have provided a very simple and efficient mechanism for accomplishing the objects of the invention.

It is to be understood that we are not limited to the specific construction shown and described herein, as various modifications may be made therein within the spirit of the invention and the scope of the appended claims.

What is claimed is:

1. An integrator of the ball and disk type comprising a frame having a base plate and a pair of spaced parallel outwardly extending side plates, an input shaft retatably mounted in said base plate, a disk secured to one end of said shaft coaxially therewith for rotation thereby, a yoke mounted in said frame between said side plates for slight rocking movement and spaced from said base plate, an output shaft rotatably mounted in said yoke, a roller secured on said output shaft coaxially therewith, the axis of said output shaft and said roller being perpendicular to and intersecting the axis of said input shaft and said disk, a pair of axially aligned contacting balls interposed between said disk and said roller with one of said balls in contact with said disk and the other of said balls in contact with said roller, a reciprocally mounted carriage in which said balls are mounted and by which said balls are adapted to be moved back and forth diametrically across said disk in a path parallel to the axis of said output shaft and roller; and means by which said carriage is reciprocated and guided in a fixed path; said means comprising a pair of axially aligned trunnions secured to opposite sides of said carriage and extending outwardly therefrom, the axis of said trunnions intersecting the common axis of said balls and being disposed parallel to the axis of said output shaft and said roller, said trunnions being reciprocally mounted in suitable guiding and supporting means carried by said spaced parallel side plates, and means connected to one of said trunnions by which said trunnions and said carriage are moved back and forth along said fixed path.

2. An integrator of the ball and disk type as claimed in claim 1 wherein a mounting shaft is mounted in said frame between said side plates for supporting said yoke, said output shaft and said output roller at their combined center of gravity.

3. An integrator of the ball and disk type comprising a frame having a base plate and a pair of spaced parallel outwardly extending side plates, an input shaft rotatably mounted in said base plate, a disk secured to one end of said shaft coaxially therewith for rotation thereby, a yoke mounted in said frame between said side plates for slight rocking movement and spaced from said base plate, an output shaft rotatably mounted in said yoke, a roller secured on said output shaft coaxially therewith, the axis of said output shaft and said roller being perpendicular to and intersecting the axis of said input shaft and said disk, a pair of axially aligned contacting balls interposed between said disk and said roller with one of said balls in contact with said disk and the other of said balls in contact with said roller, a reciprocally mounted carriage in which said balls are mounted and by which said balls are adapted to be moved back and forth diametrically across said disk in a path parallel to the axis of said output shaft and roller; and means by which said carriage is reciprocated and guided in a fixed path, said means comprising a pair of axially aligned trunnions secured to opposite sides of said carriage and extending outwardly therefrom, the axis of said trunnions intersecting the common axis of said balls and being disposed parallel to the axis of said output shaft and said roller, one of said trunnions being slidably mounted in a bushing carried by one of said side plates and the other of said trunnions being screw threaded into a driving nut rotatably mounted in the other of said side plates, and means by which said driving nut is rotated to thereby move said trunnions and said carriage back and forth along said fixed path.

4. An integrator of the ball and disk type as claimed in claim 3 wherein a mounting shaft is mounted in said frame between said side plates for supporting said yoke, said output shaft and said output roller at their combined center of gravity.

References Cited in the file of this patent

UNITED STATES PATENTS

| | | |
|---|---|---|
| 367,625 | Haynes | Aug. 2, 1887 |
| 2,397,467 | Bush et al. | Apr. 2, 1946 |
| 2,481,039 | Ross | Sept. 6, 1949 |
| 2,602,338 | Opocensky et al. | July 8, 1952 |
| 2,746,677 | Stone | May 22, 1956 |
| 2,762,239 | Van Dyke | Sept. 11, 1956 |
| 2,931,565 | Flick | Apr. 5, 1960 |